US009619586B2

(12) United States Patent
Bhaskara

(10) Patent No.: US 9,619,586 B2
(45) Date of Patent: Apr. 11, 2017

(54) COMPUTER AIDED DESIGN MODEL ANALYSIS SYSTEM

(75) Inventor: Sreeram Bhaskara, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 403 days.

(21) Appl. No.: 13/290,715

(22) Filed: Nov. 7, 2011

(65) Prior Publication Data

US 2013/0116979 A1    May 9, 2013

(51) Int. Cl.
    *G06F 17/50*    (2006.01)
(52) U.S. Cl.
    CPC .......... *G06F 17/50* (2013.01); *G06F 2217/06* (2013.01)
(58) Field of Classification Search
    None
    See application file for complete search history.

(56) References Cited

U.S. PATENT DOCUMENTS

| | | | |
|---|---|---|---|
| 7,295,958 B1* | 11/2007 | Suh et al. | 703/7 |
| 8,560,574 B2* | 10/2013 | Austin et al. | 707/793 |
| 2004/0034662 A1* | 2/2004 | Austin et al. | 707/104.1 |
| 2005/0177351 A1 | 8/2005 | Goldberg et al. | |
| 2005/0203718 A1* | 9/2005 | Carek et al. | 703/1 |
| 2006/0066609 A1* | 3/2006 | Iodice et al. | 345/419 |
| 2011/0066661 A1 | 3/2011 | Sangal et al. | |
| 2011/0098983 A1 | 4/2011 | Staples et al. | |
| 2012/0053905 A1* | 3/2012 | Iwata et al. | 703/1 |
| 2013/0346036 A1* | 12/2013 | Borjesson | 703/2 |

FOREIGN PATENT DOCUMENTS

| | | |
|---|---|---|
| CN | 101542490 A | 9/2009 |
| JP | 2008083798 A | 4/2008 |
| JP | 2009059377 A | 3/2009 |
| WO | WO2008118373 A1 | 10/2008 |

OTHER PUBLICATIONS

Sreeram Bhaskara, Re-Engineering Legacy Knowledge Based Engineering Systems Using DSM, 10th International Design Structure Matrix Conference, DSM'08, Nov. 11-12, 2008, Stockholm, Sweden, as obtained from http://www.designsociety.org/download-publication/27445/re-engineering_legacy_knowledge_based_engineering_systems_using_dsm.*
Browning, T.R., "Applying the design structure matrix to system decomposition and integration problems: a review and new directions," Engineering Management, IEEE Transactions on , vol. 48, No. 3, pp. 292-306, Aug. 2001 doi: 10.1109/17.946528.*
Amadou Coulibaly, Francois De Bertrand De Beuvron, Jean Renaud, Maintainability Assessment at Early Design Stage Using Advanced CAD Systems, Proceedings of IDMME—Virtual Concept 2010, Bordeaux, France, Oct. 20-22, 2010, 6 pages.*

(Continued)

*Primary Examiner* — Omar Fernandez Rivas
*Assistant Examiner* — Robert Brock
(74) *Attorney, Agent, or Firm* — Yee & Associates, P.C.

(57) ABSTRACT

A method and apparatus for managing models. Elements in a model of an object are identified. Dependencies for the elements are identified. At least one of a matrix of the elements and a knowledge model of the object using the elements are generated.

15 Claims, 10 Drawing Sheets

(56) References Cited

OTHER PUBLICATIONS

Lee, W.-T., Deng, W.-Y., Lee, J. and Lee, S.-J. (Jun. 7, 2010), Change impact analysis with a goal-driven traceability-based approach. Int. J. Intell. Syst., 25: 878-908. doi: 10.1002/int.20443.*

Pimmler, T. U. and S. D. Eppinger, Integration Analysis of Product Decompositions, Minneapolis, MN, ASME Conference on Design Theory and Methodology, 1994, pp. 343-351, http://web.mit.edu/eppinger/www/publications.html.*

Şule Taşli Pektaş, Mustafa Pultar, Modelling detailed information flows in building design with the parameter-based design structure matrix, Design Studies, vol. 27, Issue 1, Jan. 2006, pp. 99-122, ISSN 0142-694X, http://dx.doi.org/10.1016/j.destud.2005.07.004.*

Xu Xiaogang; Li Chao; Yan Jian; Chen Yahua, "An analytical method based on design structure matrix for modular identification," Computer-Aided Industrial Design and Conceptual Design, 2006. CAIDCD '06. 7th International Conference on , vol., No., pp. 1-4, Nov. 17-19, 2006 doi: 10.1109/CAIDCD.2006.329358.*

Pratt, Mi and Kim, Ju, 2006, Experience in the exchange of procedural shape models using ISO 10303 (STEP) Proceedings of the 2006 ACM symposium on Solid and physical modeling, Cardiff, pp. 229-238.*

Robert et al, "Towards a "high productive design methodology" dedicated to modular product design using a Knowledge Configuration approach", Proceedings of the IMProVe 2011 International conference on Innovative Methods in Product Design Jun. 15-17, 2011, Venice, Italy, pp. 126-134.*

Sered and Reich, "Standardization and modularization driven by minimizing overall process effort", Computer-Aided Design 38 (2006) 405-416.*

A. Coulibaly, R. Houssin and B. Mutel, Contribution to Maintainability and Safety Assessment in the Mechanical Product Design, International Design Conference—Design 2006, Dubrovnik—Croatia, May 15-18, 2006, pp. 207-214.*

Vahid Salehi, Chris McMahon, Development of a Generic Integrated Approach for Parametric Associative Cad Systems, International Conference on Engineering Design, ICED'09 Aug. 24-27, 2009, Stanford University, Stanford, CA, USA, 12 pages.*

J. Pandremenos, G. Chryssolouris, A CAD Based Tool for the Support of Modular Design, Proceedings of the 21st CIRP Design Conference, Korea 2011 : Interdisciplinary Design, Mar. 29, 2011, pp. 154-158.*

Jonghyun Kim, Cooperative Modeling and Design History Tracking Using Design Tracking Matrix, Master's Thesis, Texas A&M University, 2009, 57 pages.*

Martin Tapankov, Managing Dependencies in Knowledge-Based Systems: A Graph-Based Approach, Master's Thesis, Jönköping Institute of Technology, 2009, 64 pages.*

"Knowledge Based Design Exchange by Modeling Dependencies," Boeing/Northrop Grumman Global Product Data Interoperability Summit, 2010, 17 pp.

Bhaskara, "Analysis and Visualization of Complex Computer Aided Design Models as a Design Structure Matrix," 13th International Dependency and Structure Modelling Conference, Sep. 2011, 6 pp.

Bhaskara, "DSM Based Approach for Managing Requirements, Rules and Design Parameters in Knowledge Based Design Process," Proceedings of the 12th International DSM Conference, Jul. 2010, pp. 237-248.

Intellectual Property Office of the Peoples Republic of China First Office Action, regarding Application No. 2012104411494, 8 pages.

Japanese Patent Office Notice of Reasons for Rejection, dated Oct. 18, 2016, regarding Application No. 2012-244355, 5 pages.

* cited by examiner

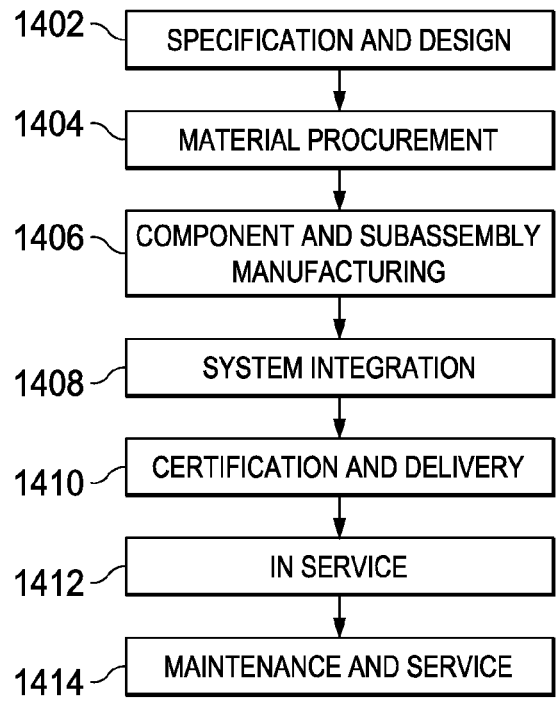
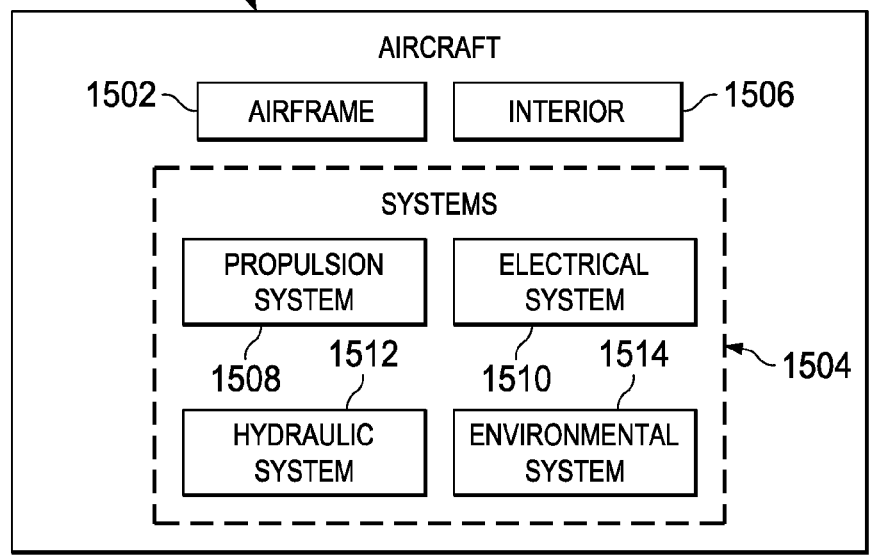

COMPUTER AIDED DESIGN MODEL ANALYSIS SYSTEM

BACKGROUND INFORMATION

1. Field

The present disclosure relates generally to models and, in particular, to computer aided design models. Still more particularly, the present disclosure relates to a method and apparatus for processing computer aided design models.

2. Background

Computer aided design (CAD) systems employ the use of computers and software to design objects. The models generated by computer aided design systems include drawings of objects. These drawings may be two-dimensional drawings, three-dimensional drawings, or a combination of the two. Additionally, these models also may include information about the objects. For example, materials, processes, dimensions, tolerances, and other information about an object and the different parts making up the object may be present. In addition, models of computer aided design systems can also include design history, features, design parameters, constraints, and dependencies of parts for an object in the models.

Computer aided design systems are often used to generate models of complex objects, such as an aircraft. With objects such as an aircraft, the size of models for these types of objects may increase in size and complexity. For example, a model of a single fuselage section for a very complex vehicle such as an aircraft may have thousands of elements, which can result in a model which is over 100 MB and/or even a terabyte in size. Such an aircraft may have many such fuselage sections, which adds to the complexity and substantially increases the size of the resultant model. The different elements in the model may have multiple complex interdependencies and may include inefficiencies such as extraneous and redundant elements. Thus, the complexity of the model greatly increases as the number of elements and complex interdependencies per elements grows. Models for other parts of the aircraft may have similar or greater numbers of elements. As a result, the cost to create, maintain, and change models also may increase more than desired.

It is often desirable to analyze, view, and check various parts of a model. Reviewing a model generated by a computer aided design system may aide a designer in validating, documenting, and understanding a design process. However, viewing a model in a computer aided design system does not easily provide this type of information to a designer or other person.

Additionally, the model may not be organized or as efficient as desired. For example, the model may be larger than needed because of duplicate elements or redundant elements in the model. As a result, a computer aided design system may not process the model as efficiently or as quickly as desired. Further, when models are larger than needed, the storage space used for the models also is larger than needed. Additionally, the CAD systems may require unnecessarily powerful and expensive components equipped with large amounts of processors, random access memory, and memory storage devices, which are needed to enable the CAD systems' users to effectively design, use, manipulate, and modify large models of complex real-world objects.

Therefore, it would be advantageous to have a method and apparatus that takes into account at least some of the issues discussed above as well as possibly other issues.

SUMMARY

In one advantageous embodiment, a method for managing models is present. Elements in a model of an object are identified. Dependencies for the elements are identified. The method generates at least one of a matrix of the elements and a knowledge model of the object using the elements.

In another advantageous embodiment, a model management system comprises a model manager and a model database. The model database is coupled to the model manager. The model manager is further configured to identify dependencies for the elements identified in the model database by the model manager. The model manager is configured to generate at least one of a matrix of the elements and a knowledge model of the object using the elements The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 14 is an illustration of an aircraft manufacturing and service method in accordance with an advantageous embodiment; and FIG. 15 is an illustration of an aircraft in which an advantageous embodiment may be implemented.

DETAILED DESCRIPTION

The different advantageous embodiments recognize and take into account a number of different considerations. For example, the different advantageous embodiments recognize and take into account that obtaining information from a model generated by a computer aided design system through the computer aided design system may be more difficult than desired. The different advantageous embodiments recognize and take into account that computer aided design systems are designed to facilitate designing of objects.

The different advantageous embodiments recognize and take into account that these systems may provide an ability to see an object from different angles, sections, and other types of views. The different advantageous embodiments recognize and take into account that these systems, however, are not well suited for viewing and analyzing other information that may be part of the model. For example, identifying dependencies between different elements may be difficult when viewing the model using computer aided design systems. Further, the different advantageous embodiments recognize and take into account that identifying extraneous elements, redundant elements, process flows, and other information may be more difficult than desired using a computer aided design system to view information within a model.

Thus, the different advantageous embodiments provide a method and apparatus for managing models. In one advantageous embodiment, elements in a model of an object are identified. Dependencies are identified for the elements. A data structure of the elements with the dependencies is generated. In these illustrative examples, a matrix of elements in the model of the object is generated.

Figure 1:
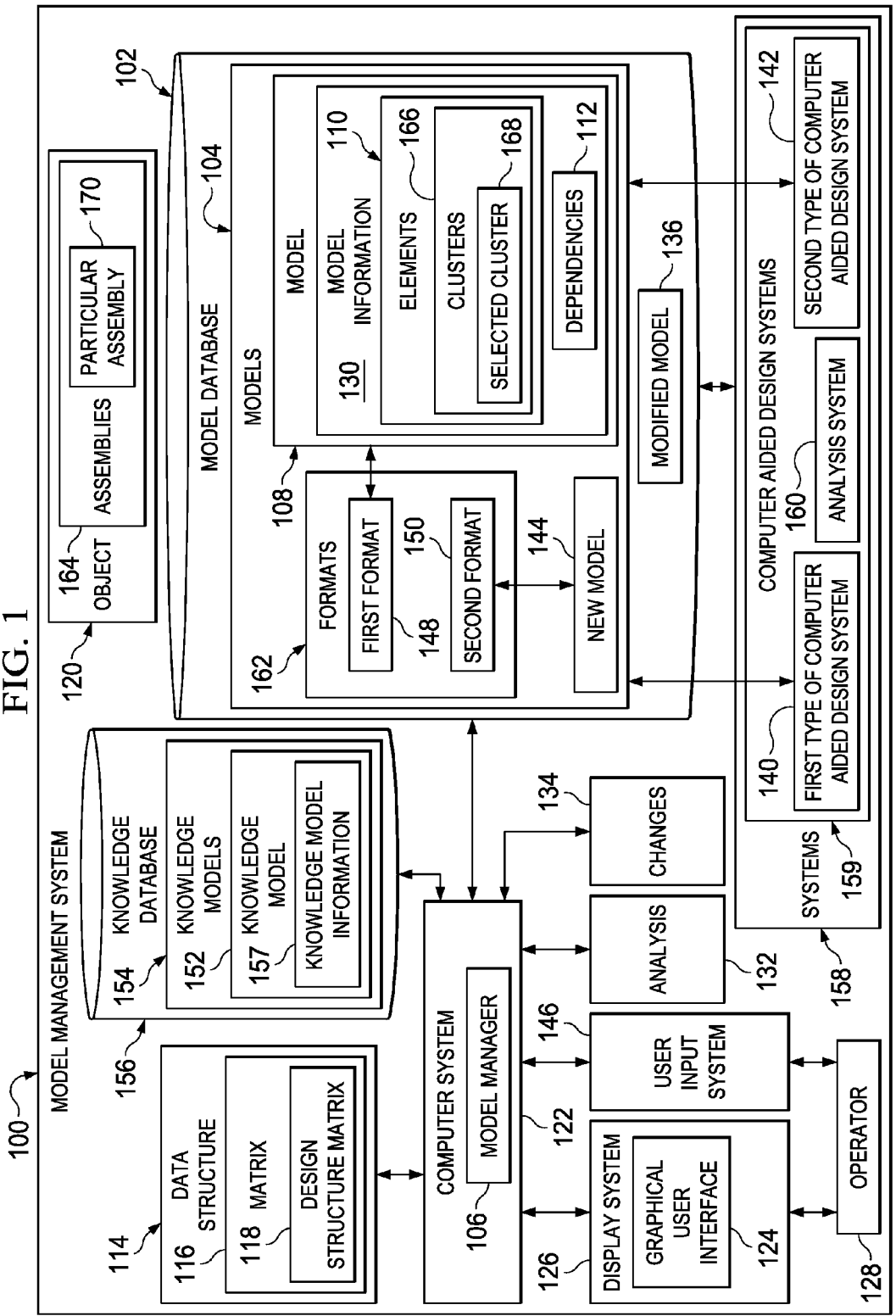
FIG. 1 is an illustration of a block diagram of a model management system in accordance with an advantageous embodiment.

With reference now to the figures and, in particular, with reference now to FIG. 1, an illustration of a model management system 100 is depicted in accordance with an advantageous embodiment. The model management system 100 in FIG. 1 includes a model database 102 of models 104. In the illustrative examples, the model database 102 of the models 104 may be vendor neutral and may have a universal format that does not rely of a particular vendor.

In these illustrative examples, a model manager 106 may manage the models 104 in the model database 102. As depicted the model database 102 is coupled to the model manager 106. In other words, the model manager 106 may be connected to a storage device, a computer system, or some other device containing the model database 102. In some cases, the model manager 106 and the model database 102 may be on the computer system 122.

The model manager 106 may be implemented in software, hardware, or a combination of the two. In these illustrative examples, the model manager 106 may be implemented in a computer system 122. The computer system 122 is one or more computers. When more than one computer is present in the computer system 122, these computers may be in communication with each other using a communication medium, such as a network.

This management of the models 104 by the model manager 106 may include at least one of analyzing models, modifying models, creating new models, and/or other operations. As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In managing the models 104, the model manager 106 may identify a model 108 for processing. The model 108 is a model of an object 120. The object 120 may take various forms in these illustrative examples. For example, the object 120 represented in the model 108 may be a mobile platform, a stationary platform, a land-based structure, an aquatic-based structure, a space-based structure, an aircraft, a submarine, a bus, a personnel carrier, a tank, a train, an automobile, a spacecraft, a space station, a satellite, a surface ship, a power plant, a dam, a manufacturing facility, a building, an engine, a wing, a propeller, a strut, a landing gear assembly, a mold, a tool, and/or some other suitable object.

As depicted, the model 108 comprises model information 130. The model information 130 includes elements 110 in these illustrative examples. Dependencies 112 are present between the elements 110 in the model 108. In these illustrative examples, the elements 110 in the model 108 are identified by the model manager 106. Additionally, the model manager 106 also identifies the dependencies 112 between the elements 110 from the model information 130 in the model 108.

In these illustrative examples, the model manager 106 creates a data structure 114. As depicted, the data structure 114 takes the form of a matrix 116. The elements 110 identified from the model 108 are placed into the matrix 116 by the model manager 106. Additionally, the matrix 116 includes the dependencies 112 between the elements 110 as identified by the model manager 106.

In these illustrative examples, the matrix 116 takes the form of a design structure matrix 118. The design structure matrix 118 may also be referred to as a dependency structure method, a dependency structure matrix, a problem-solving matrix, an incidence matrix, an n-square matrix, and/or a design precedence matrix.

In generating the design structure matrix 118, the model manager 106 may implement any currently used processes for creating design structure matrices. The design structure matrix 118 is a matrix representation of the model 108. In particular, the matrix representation provides an ability to analyze, visualize, or perform other operations with respect to information in the model 108.

Currently available analysis techniques analyze information in design structure matrices. Some of these currently available techniques include, for example, partitioning, tearing, banding, clustering, sensitivity, and other known techniques for analyzing design structure matrices.

The selection of a particular technique or combination of techniques depends on at least one of the size of the model 108, the complexity of the model 108, the number of dependencies in the model 108, the domain of the model 108, and other factors about the model 108. The domain of the model 108 is what the model 108 covers or the scope of the model 108. For example, the domain of the model 108 may be any design problem space, such as, for example, aerospace, automotive, marine, semiconductors, and other suitable areas. In another illustrative example, the domain may be a phase of design, such as a conceptual phase, a detailed design phase, and other phases of design. In still another example, the domain may be a functional area, such as tooling, systems, structures, electrical, and other suitable functional areas.

In the illustrative examples, the structure of the model 108 and the dependencies 112 for the elements 110 may also depend on the nature of the design problem which is dependent on a phase of design domain. For example, with phases of design, the conceptual phase is more iterative in nature than other phases downstream from the conceptual phase, such as a detailed design phase. The detailed design phase is more detail oriented than the conceptual phase. Another illustrative example is that the dependencies 112 in a structural domain are more hierarchical in nature than in an electrical domain. These differences in domains may lead to different selections of techniques for analyzing the design structure matrix 118 because different types of change and/or amounts of change may occur when the model 108 has different domains.

An example of an analysis technique that may be used to analyze the impact of a change to the model 108 is a sensitivity analysis technique. This analysis technique may be applied to the design structure matrix 118 for the model 108. The sensitivity analysis technique may potentially identify the elements 110 in the model 108 that are sensitive to a change. These elements 110 may then be grouped together to create a cluster and/or sub-cluster by applying clustering analysis.

A graphical user interface 124 may be used to interact with the model 108, the matrix 116, or some combination thereof. In these illustrative examples, the graphical user interface 124 is displayed on a display system 126, which is coupled to the model manager 106. The display system 126 is hardware and also may include software. In these illustrative examples, the display system 126 is one or more display devices.

User input to the graphical user interface 124 may occur using a user input system 146, which is coupled to the model manager 106. The user input system 146 may include at least one of a mouse, a touch screen, a keyboard, a trackball, a joystick, and/or some other suitable type of user input device. The user input may be made to manipulate the model 108, the matrix 116, and/or other information accessible by the model manager 106 in the model management system 100. In these examples, the manipulation may include at least one of changing view, modifying information, adding information, deleting information, and/or other suitable operations.

Additionally, an analysis 132 may be performed using the matrix 116. The analysis 132 may be used to identify changes 134 to the model 108. In other illustrative examples, the analysis 132 may provide information for use in other operations that may involve designing objects similar to the object 120. In these illustrative examples, the changes 134 may form a modified model 136 from the model 108.

In still other illustrative examples, the model 108 may be configured for use with one or more systems 158. The systems 158 may be hardware, software, or a combination of the two. In these illustrative examples, the systems 158 may include computer aided design systems 159. These computer aided design systems 159 may include, for example, a first type of computer aided design system 140, a second type of computer aided design system 142, an analysis system 160, and/or other suitable types of systems that may use the models 104 in model the model database 102.

In these illustrative examples, different one of the systems 158 may use the models 104 with different formats from formats 162 for the models 104. For example, the model 108 may have a first format 148 that is used by the first type of computer aided design system 140.

In some cases, it may be desirable to use the model 108 with the second type of computer aided design system 142. In this illustrative example, the second type of computer aided design system 142 uses a second format 150. As depicted, the model 108 with the first format 148 is unusable by the second type of computer aided design system 142 because the model 108 is in the first format 148.

For example, the first type of computer aided design system 140 may be Catia and/or SolidWorks, and the second type of computer aided design system 142 may be AutoCad and/or NX Unigraphics. In another illustrative example, the first type of computer aided design system 140 may be a first version of Catia, while the second type of computer aided design system 142 may be a second version of Catia.

In these illustrative examples, the model manager 106 may generate a new model 144 from the model 108 that is configured for use with the second type of computer aided design system 142 using the matrix 116. In these illustrative examples, the new model 144 has the second format 150, which is usable by the second type of computer aided design system 142. The new model 144 is also a model of the object 120, but is usable in the second format 150 that is used by the second type of computer aided design system 142.

The process of generating the new model 144 from the matrix 116 may include generating a knowledge model 152 in knowledge models 154 in a knowledge database 156, which is coupled to the model manager 106. In these illustrative examples, the knowledge model 152 contains knowledge model information 157 needed to create the new model 144 for use with the second type of computer aided design system 142. In the illustrative examples, the knowledge model information 157 in the knowledge model 152 may be in a number of different formats. For example, without limitation, the knowledge database 156 may store the knowledge model information 157 for the knowledge model 152 in a markup language format such as an extensible markup language (XML), a relational database, an object-oriented database, or in some other suitable format.

In these illustrative examples, the model manager 106 does not perform a translation of the model 108 in the first format 148 into the new model 144 with the second format 150. Instead, the model manager 106 extracts the model information 130 from the model 108 and creates the matrix 116 using the model information 130. The model information 130 is also used to generate the knowledge model 152. The knowledge model information 157 in the knowledge model 152 is used to create the new model 144 for the object 120. The new model 144 has the second format 150 that is selected for the type of system that the new model 144 is to be used by in these illustrative examples.

In addition, the model manager 106 also may create the new model 144 with the second format 150 that is configured for use with the analysis system 160 in the systems 158 using the knowledge model 152. The analysis system 160 may be, for example, a finite element analysis system, a simulation system, a neural network, and/or some other suitable type of analysis system. This type of the new model 144 may be created when the analysis system 160 does not use a format in the formats 162 for the computer aided design systems 159, such as the first type of computer aided design system 140 and the second type of computer aided design system 142. In this manner, the knowledge models 154 in the knowledge database 156 may function as a universal source for creating the models 104 with the formats 162 for use with the systems 158.

Further, the object 120 may include assemblies 164 represented by the elements 110 in the model 108 of the object 120. In these illustrative examples, clusters 166 may be identified in the elements 110 in the model 108. These clusters 166 may be identified using the matrix 116 in the illustrative examples. The clusters 166 correspond to the assemblies 164 in the object 120.

With this ability to identify the clusters 166, the new model 144 may be created for a particular assembly 170 in the assemblies 164. For example, a selected cluster 168 in the clusters 166 corresponds to the particular assembly 170 in the assemblies 164. With the identification of the selected cluster 168, the model manager 106 may use the knowledge model 152 to generate the new model 144 for just the selected cluster 168. In other words, the new model 144 is a model for the particular assembly 170 rather than all of the assemblies 164 for the object 120. As a result, the new model 144 for the particular assembly 170 is smaller in size and/or complexity as compared to the model 108 of the object 120.

This feature may be particularly useful when an operator 128 desires to view or analyze the particular assembly 170 rather than all of the assemblies 164 for the object 120. For example, the new model 144 for the particular assembly 170 may be created for use on either the first type of computer aided design system 140 or the second type of computer aided design system 142. As another example, the new model 144 for the particular assembly 170 may be created for analysis by the analysis system 160. With this ability to create smaller sizes for the models 104, the processing and analysis of these versions of the models 104 may be performed more quickly than using the original versions of the models 104.

In this manner, the model manager 106 may make analyzing the models 104 easier as compared to employing a computer aided design system. Additionally, the model manager 106 may be used to convert the model 108 in the models 104 for use in the second type of computer aided design system 142.

As a result, if the models 104 in the model database 102 include vendor specific formats, the knowledge database 156 with the knowledge models 154 provide vendor neutral models from which the new model 144 can be made. In other words, the knowledge models 154 in the knowledge database 156 are not proprietary and rely on any vendor format. The knowledge models 154 can be turned into the models 104 with formats 162 for specific computer aided design systems 159 currently present or for future computer aided design systems.

The illustration of the model management system 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, the knowledge model information 157 may be generated by the model manager 106 without generating the matrix 116. Instead, the knowledge model information 157 for the knowledge model 152 may be identified by the model manager 106 from the model 108. The model manager 106 may identify the knowledge model information 157 for the knowledge model 152 directly or may send calls, commands, and/or requirements to the first type of computer aided design system 140.

Figure 2:
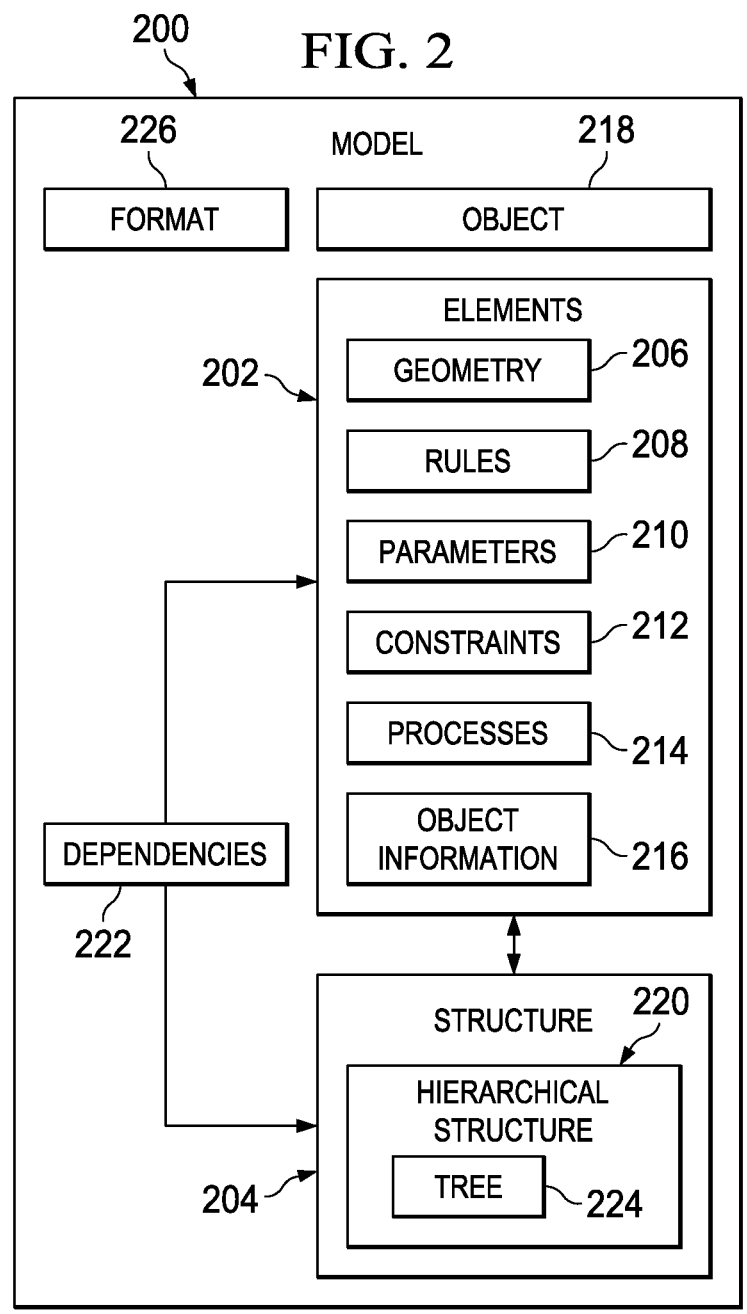
FIG. 2 is an illustration of a block diagram of a model in accordance with an advantageous embodiment.

Turning next to FIG. 2, an illustration of a block diagram of a model 200 is depicted in accordance with an advantageous embodiment. In this illustrative example, the model 200 has a format 226 for a particular type of system in the systems 158 in FIG. 1. As depicted, the model 200 depicted in FIG. 2 is an example of the model 108 illustrated in the model management system 100 in FIG. 1.

In this illustrative example, the model 200 comprises elements 202 in a structure 204. In these illustrative examples, the elements 202 may include at least one of geometry 206, rules 208, parameters 210, constraints 212, processes 214, object information 216, and/or other types of elements.

The geometry 206 in the elements 202 may include at least one of solids, surfaces, planes, points, curves, vertexes, edges, faces, and/or other suitable types of geometry 206. The rules 208 may include, for example, without limitation, any expert rules and formulae that can be applied to any object. These rules 208 may be used across the lifecycle of a product. The rules 208 may include rules for design, manufacturing, tooling, analysis, environmental, configuration, costing, and other suitable rules.

The parameters 210 may include values for parameters relating to the geometry 206, the rules 208, the processes 214, and/or other elements 202. In these illustrative examples, the constraints 212 may be values that limit or set the parameters 210. The processes 214 may include processes for manufacturing an object 218. Additionally, the processes 214 may include steps for assembling the object 218, depending on the particular implementation.

The object information 216 may be any information about the object 218. For example, the object information 216 may be notes made by a designer, comments about materials for manufacturing the object 218, production plans, material costs, environmental information, and/or other suitable information.

In these illustrative examples, the structure 204 is used to organize the elements 202. As depicted, the structure 204 is a hierarchical structure 220. In these illustrative examples, the hierarchical structure 220 is used to organize the elements 202 with respect to each other. With the hierarchical structure 220 for the elements 202, dependencies 222 may be formed between the elements 202 using the hierarchical structure 220. In these illustrative examples, the hierarchical structure 220 may take the form of a tree 224.

Figure 3:
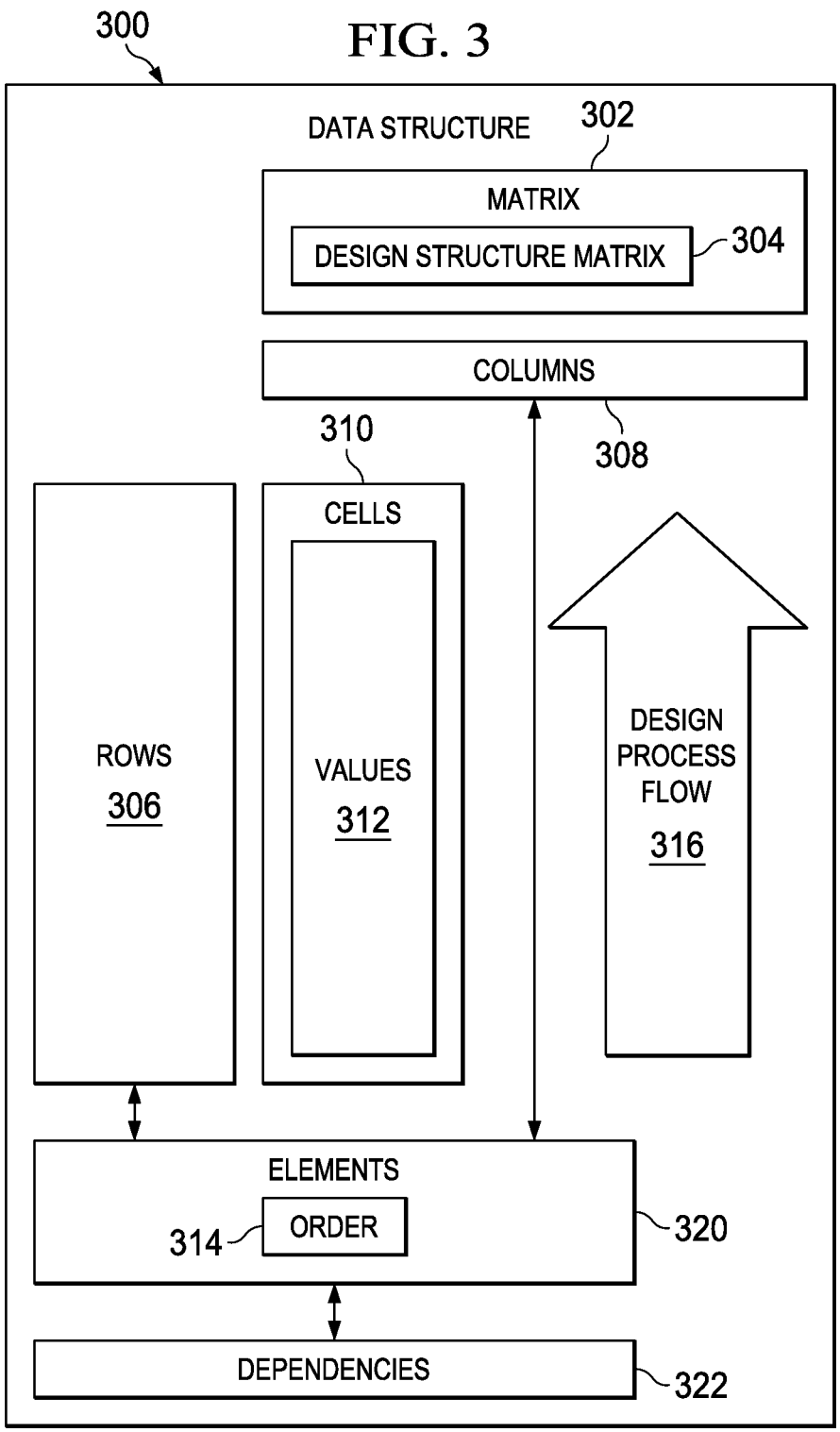
FIG. 3 is an illustration of a block diagram of a data structure in accordance with an advantageous embodiment.

With reference now to FIG. 3, an illustration of a block diagram of a data structure 300 is depicted in accordance with an advantageous embodiment. The data structure 300 illustrated in FIG. 3 is an example of an implementation for the data structure 114 in FIG. 1. In this particular example, the data structure 300 is a matrix 302 generated from the model 200 in FIG. 2. More specifically, the matrix 302 takes the form of a design structure matrix 304.

As illustrated, the matrix 302 has rows 306 and columns 308. The rows 306 and the columns 308 are for elements 320. The elements 320 in the matrix 302 correspond to the elements 202 in FIG. 2. Further, the matrix 302 also has cells 310. Values 312 for the cells 310 provide information about the elements 320 in the matrix 302. In particular, the values 312 provide information about dependencies 322 between the elements 320 in the matrix 302. These dependencies 322 for the elements 320 correspond to the dependencies 222 for the elements 202 in the model 200 in FIG. 2.

In these illustrative examples, the matrix 302 provides an easier way to identify the dependencies 222 for the elements 202 in the model 200 as compared to identifying the dependencies 222 directly from the model 200.

Further, an order 314 of the elements 320 in the matrix 302 may indicate a design process flow 316 for the elements 202 in the model 200 in FIG. 2.

Figure 4:
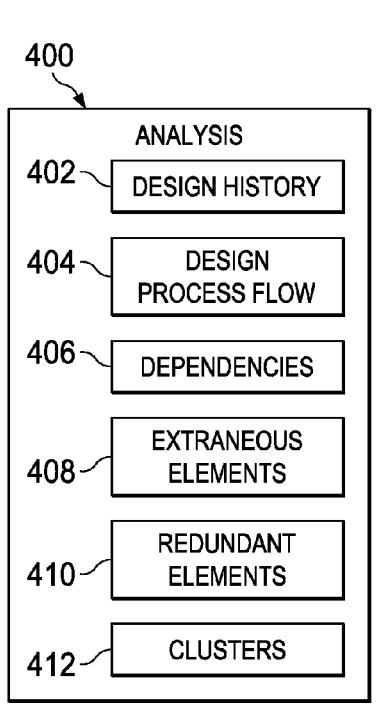
FIG. 4 is an illustration of a block diagram of an analysis in accordance with an advantageous embodiment.

With reference now to FIG. 4, an illustration of a block diagram of an analysis 400 is depicted in accordance with an advantageous embodiment. The analysis 400 in FIG. 4 is an example of the analysis 132 in FIG. 1. The analysis 400 is performed using a data structure, such as the data structure 300 in FIG. 3.

As depicted, the analysis 400 in FIG. 4 may include identifying at least one of a design history 402, a design process flow 404, dependencies 406, extraneous elements 408, redundant elements 410, and clusters 412.

The design history 402 may indicate when changes or revisions were made. In these illustrative examples, the design history 402 represents design iterations and intermediate objects that are created at different stages of the design process. Intermediate objects are identified using clustering analysis and iterations in the design process can be identified in the matrix as feedback loops or cross dependencies that show interdependencies among the elements 202 from FIG. 2.

For example, inside a sub-cluster an element that depends on other elements but has no dependent elements inside the sub-cluster can be an intermediate object of the design process. A list of these intermediate objects may become part of the design history. Also, design iterations change the model 200 over time. The changes may be part of the design history 402. These changes to the model 200 in the design history 402 may be obtained by analyzing different dependencies present for different versions of the model 200 using the matrix 302. In particular, as the model 200 changes, the matrix 302 also changes. These changes may be included in the design history 402. These changes and other changes may be included in the design history 402 as part of the overall design history.

The design process flow 404 may identify an order in which the elements 202 were added to the model 200 in FIG. 2. In these illustrative examples, the elements in the clusters and/or the sub-clusters may be analyzed to identify the design process flow 404 for the elements 202 in the clusters and/or the sub-clusters. The analysis 400 may identify the dependencies 406 between the elements 202 and may apply partitioning and topological sort algorithms to generate the design process flow 404. Also, a similar analysis may be made between the clusters and/or the sub-clusters. For example, dependencies 406 between the clusters and/or sub-clusters may be topologically sorted to identify the design process flow 404 for these components. In other words, the design process flow 404 may be identified at different levels of granularity.

The design process flow 404 may be used to analyze how the model 200 in FIG. 2 was created by a designer. This design process flow 404 may be used to create other models in the models 104 in FIG. 1.

The dependencies 406 in the analysis 400 are identifications of the dependencies 222 for the elements 202 for the model 200 in FIG. 2. The extraneous elements 408 may be portions of the elements 202 that may be removed from the model 200 in FIG. 2.

The redundant elements 410 are portions of the elements 202 in FIG. 2 that may be consolidated. For example, two identical functions may be present in the elements 202 in the model 200 in FIG. 2. The two sets of elements in the elements 202 in the model 200 may each use one of the functions. The model 200 may be modified such that both sets of the elements in the elements 202 use the same function rather than both because they are identical.

The clusters 412 may be examined to identify groupings of the elements 202 in the model 200 in FIG. 2. For example, an element cluster in the clusters 412 may be an assembly in the model 200 in FIG. 2 that may be identified with the analysis 400 performed using the data structure 300 in FIG. 3. The clusters 412 may be assemblies 164 in the object 120 in FIG. 1. For example, one cluster in the clusters 412 may be a landing gear assembly, another cluster may be an engine housing, and another cluster may be an aircraft network data processing system. With the identification of the clusters 412, review and visualization of these assemblies may be made more easily.

Further, with the analysis 400, various operations may be performed. For example, the analysis 400 may be used to modify the model 200. In these illustrative examples, the extraneous elements 408 identified in the elements 202 for the model 200 in FIG. 2 may be removed. In this manner, the size of the model 200 may be reduced. Further, when redundant elements 410 in the elements 202 for the model 200 in FIG. 2 may be consolidated, the model 200 in FIG. 2 again may be reduced in size. Further, the model 200 in FIG. 2 may be reduced in complexity. In this manner, the model 200 in FIG. 2 may be processed more efficiently by a computer aided design system or by some other software, such as an analysis program.

With these capabilities in mind, it can be further appreciated that any amount of reduced complexity will substantially improve the efficiency by which the elements 202 of the model 200 can be processed and manipulated by a user of one or more of the computer aided design systems 159. Additionally, many such complex forms of the object 120 in FIG. 1 and/or the object 218 in FIG. 2 may have industry standard practices and requirements, which mandate that information must be maintained and/or stored for the entire life cycle of the object 120 in FIG. 1 and/or the object 218 in FIG. 2.

Such information that must be maintained and/or stored may typically include design and manufacturing information, which may be included in the model database 102, the data structure 114, and/or the knowledge database 156. The capability to reduce the size of the information that must be maintained can reduce the costs associated with the long-term retention of such information over the life cycle of the object 120 in FIG. 1 and/or the object 218 in FIG. 2.

Also, the current innovation enables such maintenance and/or storage of such information within the model database 102, the data structure 114, and/or the knowledge database 156 in a form that is independent of any particular or specific CAD vendor. Thus, such information can be better utilized over the life cycle of the object 120 and/or the object 218 even as vendors leave and/or arise within the CAD industry, or even if such CAD tools become obsolete as new and more capable CAD systems enter the CAD industry.

As another illustrative example, with the identification of the clusters 412 for the elements 202, analysis of those clusters may be made. In these illustrative examples, the clusters 412 correspond to assemblies of the elements 202. With an identification of the clusters 412, the new model 144 in FIG. 1 may be made for one or more of the clusters 412. This new model 144 is smaller and/or less complex than the model 200 in FIG. 2. As a result, the new model 144 may be processed more quickly as compared to the model 200 in FIG. 2 when a further analysis is performed.

Figure 5:
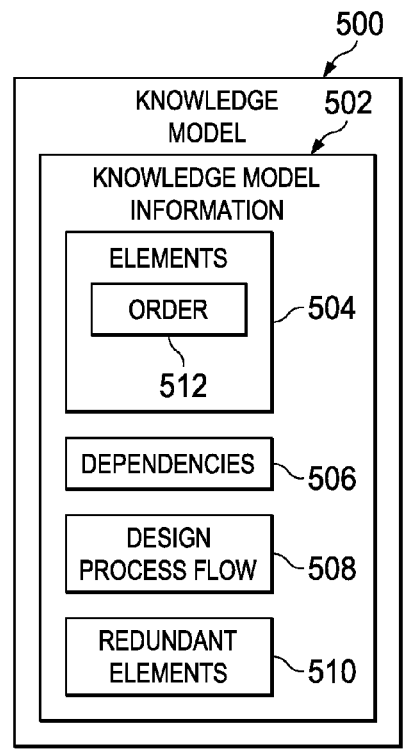
FIG. 5 is an illustration of a block diagram of a knowledge model in accordance with an advantageous embodiment.

With reference now to FIG. 5, an illustration of a block diagram of a knowledge model 500 is depicted in accordance with an advantageous embodiment. In this illustrative example, the knowledge model 500 illustrated in FIG. 5 is an example of the knowledge model 152 in FIG. 1.

In this illustrative example, the knowledge model 500 is created using the data structure 300 in FIG. 3. As depicted, the knowledge model 500 comprises knowledge model information 502. The knowledge model information 502 includes at least one of elements 504, dependencies 506, design process flow 508, redundant elements 510, and/or other suitable forms of object information.

In these illustrative examples, the design process flow 508 identifies the order in which the elements 504 were created for a model in model database 102 in FIG. 1. The design process flow 508 may be used to identify an order 512 in which the elements 504 were used to create the model from which the knowledge model 500 was created.

The design process flow 508 may be used to create the new model 144 in FIG. 1. The creation of the new model 144 in FIG. 1 may be created by adding the elements 504 in the order 512 identified through the design process flow 508.

For example, the elements 504 may include a first point, a second point, a third point, and a spline. The design process flow 508 may indicate that the first point was created first and that the second point was created after the creation of the first point. The design process flow 508 may also indicate that the third point was created after the second point. Further, the creation of the spline may occur after the creation of the third point as identified in the design process flow 508.

This sequence of creation forms a portion of the order 512 for the elements 504. This sequence in the order 512 may be used to create the new model 144 from the model 108 in FIG. 1 that is configured to be used in a desired type of system in the systems 158 in FIG. 1.

The illustrations in FIGS. 2-5 of example implementations for components in the model management system 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, the knowledge model 500 in FIG. 5 is shown as having the design process flow 508. In some illustrative examples, the design process flow 508 may be omitted from the knowledge model information 502 in the knowledge model 500. The design process flow 508 may be identified when the new model 144 is created.

Figure 6:
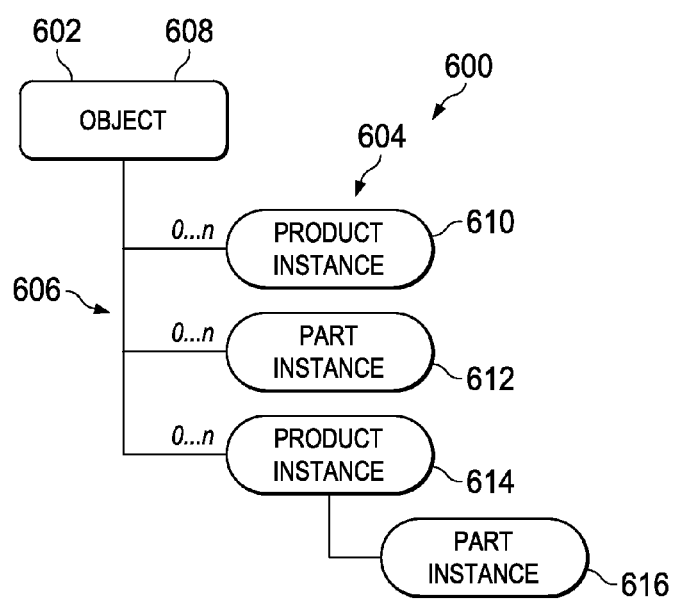
FIG. 6 is an illustration of a tree structure for a model of an object in accordance with an advantageous embodiment.

With reference now to FIG. 6, an illustration of a tree structure for a model 600 of an object 602 is depicted in accordance with an advantageous embodiment. The model 600 is an example of an implementation of the model 200 in FIG. 2.

In this illustrative example, the model 600 is for the object 602. The object 602 is defined by elements 604 arranged in a tree 606. In this illustrative example, the tree 606 in FIG. 6 is an example of the tree 224 in FIG. 2.

As depicted, the tree 606 has nodes 608, 610, 612, 614, and 616. These nodes represent different elements in the model 600 in FIG. 6. In this illustrative example, the node 608 is a root node for the object 602, the node 610 is a product instance, the node 612 is a part instance, the node 614 is a product instance, and the node 616 is a part instance. In this example, the nodes 608, 610, 612, 614, and 616 may reference other objects. Those objects may also have structures such as the tree 606.

Figure 7:
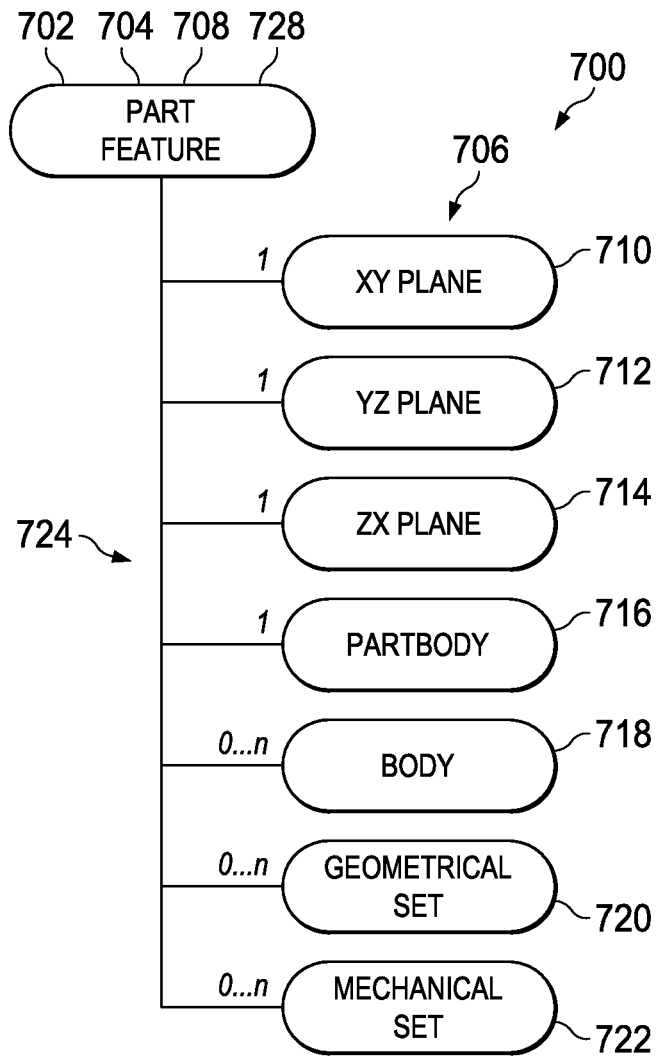
FIG. 7 is an illustration of another tree structure for a model of an object in accordance with an advantageous embodiment.

With reference now to FIG. 7, an illustration of another tree structure for a model 700 is depicted in accordance with an advantageous embodiment. The model 700 is an example of an implementation of the model 200 in FIG. 2.

In this illustrative example, the model 700 is for an object 702 in the form of a part 704. In this illustrative example, the part 704 includes elements 706 arranged in nodes 708, 710, 712, 714, 716, 718, 720, and 722 in a tree 724. The object 702 may be an example of an object included as an element in the model 600 in FIG. 6.

In this illustrative example, the node 708 is a root node 728 for the part 704. The root node 728 identifies the object 702 in FIG. 7. In this illustrative example, the node 710 represents an XYPlane, the node 712 represents a YZPlane, and the node 714 represents a ZXPlane. The node 716 represents a part body. The part body is a solid that defines the part 704. The node 718 is a body. This body is an optional solid that may be used in the part 704. The node 720 is a geometrical set. This geometrical set in the node 720 may define lines, points, and/or other suitable geometries. The node 722 is a mechanical set in this illustrative example. A mechanical set of elements is a set of non-geometrical elements. The illustration of the model 600 in the tree 606 in FIG. 6 and the model 700 in the tree 724 in FIG. 7 are only meant as examples of trees that may be used to organize and create relationships between the elements 604 in FIG. 6 and the elements 706 in FIG. 7. Of course, in actual implementation, these tree structures may be much more complex and may contain many more elements.

The model 600 in FIG. 6 may be processed to identify the elements 604 and their dependencies. The dependencies may be identified from the arrangement of the elements in the tree structure. In a similar fashion, the model 700 in FIG. 7 may be processed to identify the elements 706 and their dependencies. This process may be applied to any model in the models 104 in the model database 102 in FIG. 1.

Figure 8:
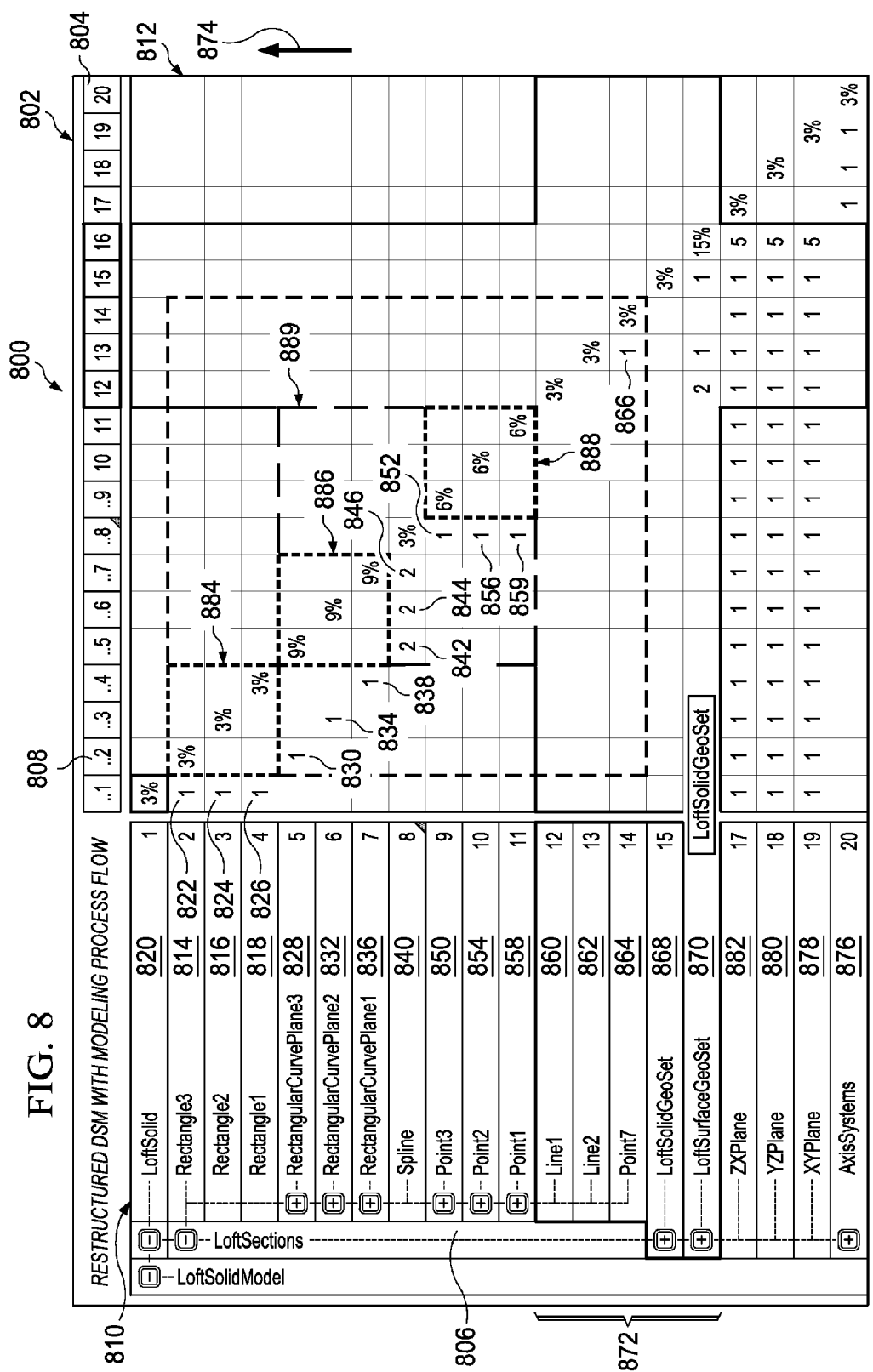
FIG. 8 is an illustration of a data structure in the form of a matrix in accordance with an advantageous embodiment.

Next in FIG. 8, an illustration of a data structure 800 in the form of a matrix 802 is depicted in accordance with an advantageous embodiment. In this illustrative example, the matrix 802 in FIG. 8 is a design structure matrix 804. This design structure matrix 804 is an example of the design structure matrix 304 in FIG. 3. In these illustrative examples, the design structure matrix 804 may be displayed in the graphical user interface 124 in the display system 126 in FIG. 1.

As depicted, the design structure matrix 804 comprises rows 806 and columns 808. The rows 806 represent elements 810. These elements 810 are also located in the columns 808. In these illustrative examples, cells 812 in the design structure matrix 804 may provide information about a model, such as the model 108 in FIG. 1.

For example, the elements 810, including a rectangle3 814, a rectangle2 816, and a rectangle1 818, have a dependency to a LoftSolid 820. This dependency with the LoftSolid 820 is indicated by cells 822, 824, and 826, respectively.

As another example, RectangularCurvePlane3 828 has a dependency with the rectangle3 814 as indicated in a cell 830. RectangularCurvePlane2 832 has a dependency with the rectangle2 816 as indicated by a cell 834. RectangularCurvePlane1 836 has a dependency with the rectangle1 818 as indicated by a cell 838. In yet another illustrative example, a Spline 840 has a dependency with the RectangularCurvePlane3 828, the RectangularCurvePlane2 832, and the RectangularCurvePlane1 836 as indicated by cells 842, 844, and 846, respectively.

As can be seen, the cells 812 indicate a dependency between elements when a value is present in the cells 812. Further, the values also may indicate a strength of the dependency. For example, the cells 842, 844, and 846 indicate a stronger dependency as compared to the cells 830, 834, and 838. In another illustrative example, Point3 850 has a dependency with the Spline 840 as indicated by a cell 852. Point2 854 has a dependency as indicated by a cell 856. Point1 858 has a dependency with the Spline 840 as indicated by a cell 859.

In these illustrative examples, Line1 860, Line2 862, and Point7 864 do not have any dependencies that lead back to the LoftSolid 820. For example, the Line1 860 and the Line2 862 do not have any dependencies with any other of the elements 810. The Point7 864 has a dependency to the Line2 862 as indicated by a cell 866. However, the Line2 862 has no dependency back to the LoftSolid 820. As a result, Line1 860, Line2 862, and Point7 864 are extraneous features.

As another example, the LoftSolidGeoSet 868 and the LoftSurfaceGeoset 870 are sets of elements 810 that do not have any dependencies. With the identification of the extraneous elements 872, the model 108 in FIG. 1 may be modified to remove these extraneous elements 872. As a result, this change to the model 108 may form the modified model 136 in FIG. 1.

Further, the design structure matrix 804 may be used to identify other information in addition to the extraneous elements 872 and the dependencies as shown. For example, modeling process flow for the model containing the elements 810 may be identified from the design structure matrix 804. In this illustrative example, an arrow 874 indicates the modeling process flow direction. For example, AxisSystems 876 is the first of the elements 810 placed into the model. XYPlane 878, the YZPlane 880, and the ZXPlane 882 are the next elements placed into the model, respectively. The arrow 874 illustrates the addition of other elements 810 to the model.

Additionally, clusters 884, 886, 888, and 889 also may be identified from the design structure matrix 804. The clusters 884, 886, and 888 are groupings of like elements. First, the cluster 884 is a grouping of rectangles, rectangle3 814, rectangle2 816, and rectangle1 818. Next, the cluster 886 is a grouping of rectangular curve planes: RectangularCurvePlane1 836, RectangularCurvePlane2 832, and RectangularCurvePlane3 828. The cCluster 888 is a grouping of points: Point1 858, Point2 854, and Point3 850.

The cluster 889 is a grouping of the elements 810 that have dependencies on each other. In this illustrative example, the cluster 889 includes RectangularCurvePlane1 836, RectangularCurvePlane2 832, RectangularCurvePlane3 828, Point1 858, Point2 854, Point3 850, and the spline 840.

When identified, the clusters 884, 886, 888, and 889 may be used to generate a view of particular ones of the elements 810 that have dependencies with each other. The clusters 884, 886, 888, and 889 may be identified in a number of different ways using currently known techniques. Examples of some techniques that may be used include, for example, partitioning algorithms, hierarchical clustering algorithms, and other suitable techniques. These techniques may be used alone or in combination to identify potential clusters. Partitioning may be used to create subsystems by grouping and sorting the subsystems based on the dependencies. These subsystems may represent assemblies or other groupings in the elements 810 in design structure matrix 804.

Figure 9:
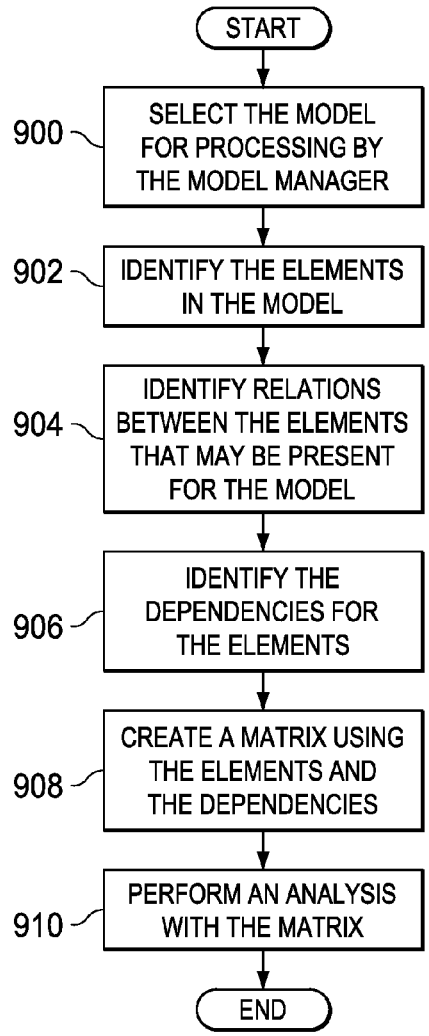
FIG. 9 is an illustration of a flowchart of a process for managing models in accordance with an advantageous embodiment.

With reference now to FIG. 9, an illustration of a flowchart of a process for managing the models 104 is depicted in accordance with an advantageous embodiment. In this illustrative example, the process may be implemented in the model manager 106 in FIG. 1. For example, the model manager 106 may select the model 200 in FIG. 2 for processing (operation 900).

Thereafter, the elements 202 in the model 200 are identified (operation 902). The identification may be performed by the model manager 106 processing the model 108 directly, by the model manager 106 interacting with the first type of computer aided design system 140, or a combination of the two. For example, the model manager 106 may send calls to the first type of computer aided design system 140 in the form of application programming interface calls to an interface in the first type of computer aided design system 140.

The process then identifies relations between the elements 202 that may be present for the model 200 (operation 904). In particular, the model 200 may have a format 226. The format 226 may define potential relations between the elements 202 in the model 200. These potential relations may be between the elements 202 in the model 200. Examples, of potential relations between elements that can be identified are parent-child relations, physical connections, input-output relations, and other relations. These potential relations are ones that may be used in a computer aided design system. Some potential relations may be in all of the computer aided design systems 159 and some may be only in selected computer aided design systems 159 in FIG. 1.

Thereafter, the process identifies the dependencies 222 for the elements 202 (operation 906). Some of the dependencies 222 for the elements 202 identified in operation 906 may be, for example, parent-child relations, physical connections, input-output relations, and other dependencies. The process then creates a matrix using the elements 202 and the dependencies 222 (operation 908).

With the matrix, an analysis 400 may be performed (operation 910), with the process terminating thereafter. Further, different actions may be taken based on the analysis 400.

Figure 10:
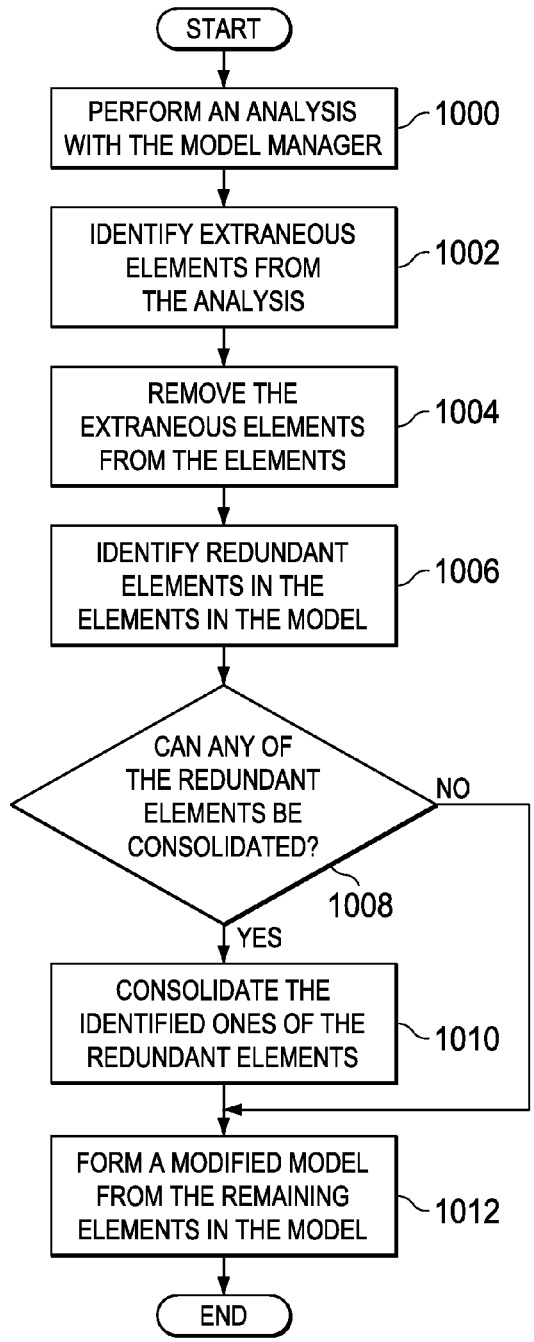
FIG. 10 is an illustration of a flowchart of a process for modifying a model in accordance with an advantageous embodiment.

With reference now to FIG. 10, an illustration of a flowchart of a process for modifying the model 200 is depicted in accordance with an advantageous embodiment. In these illustrative examples, the model manager 106 may perform an analysis 132 such as the analysis 400 in FIG. 4 (operation 1000). The analysis 400 may be performed using the matrix 302 in FIG. 3. The process identifies extraneous elements 408 from the analysis 400 in FIG. 4 (operation 1002).

The extraneous elements 408 are in the elements 202 in the model 200 in FIG. 2. When an identification of the extraneous elements 408 in the elements 202 is made, the process removes the extraneous elements 408 from the elements 202 (operation 1004). Operation 1004 may be performed by the model manager 106 processing the model 200 directly, by the model manager 106 interacting with the first type of computer aided design system 140, or a combination of the two.

Next, the process identifies redundant elements 410 in the elements 202 in the model 200 (operation 1006). A determination is made as to whether any of the redundant elements 410 can be consolidated (operation 1008).

If some or all of the redundant elements 410 can be consolidated, the process consolidates the identified ones of the redundant elements 410 (operation 1010). This consolidation of the redundant elements 410 may be made to the model 200 directly, using the first type of computer aided design system 140, or a combination of the two. The process then forms a modified model 136 from the remaining elements in the model 200 (operation 1012) with the process terminating thereafter.

With reference again to operation 1008, if none of the redundant elements 410 can be consolidated, the process also proceeds to operation 1012 as described above.

Figures 11, 12:
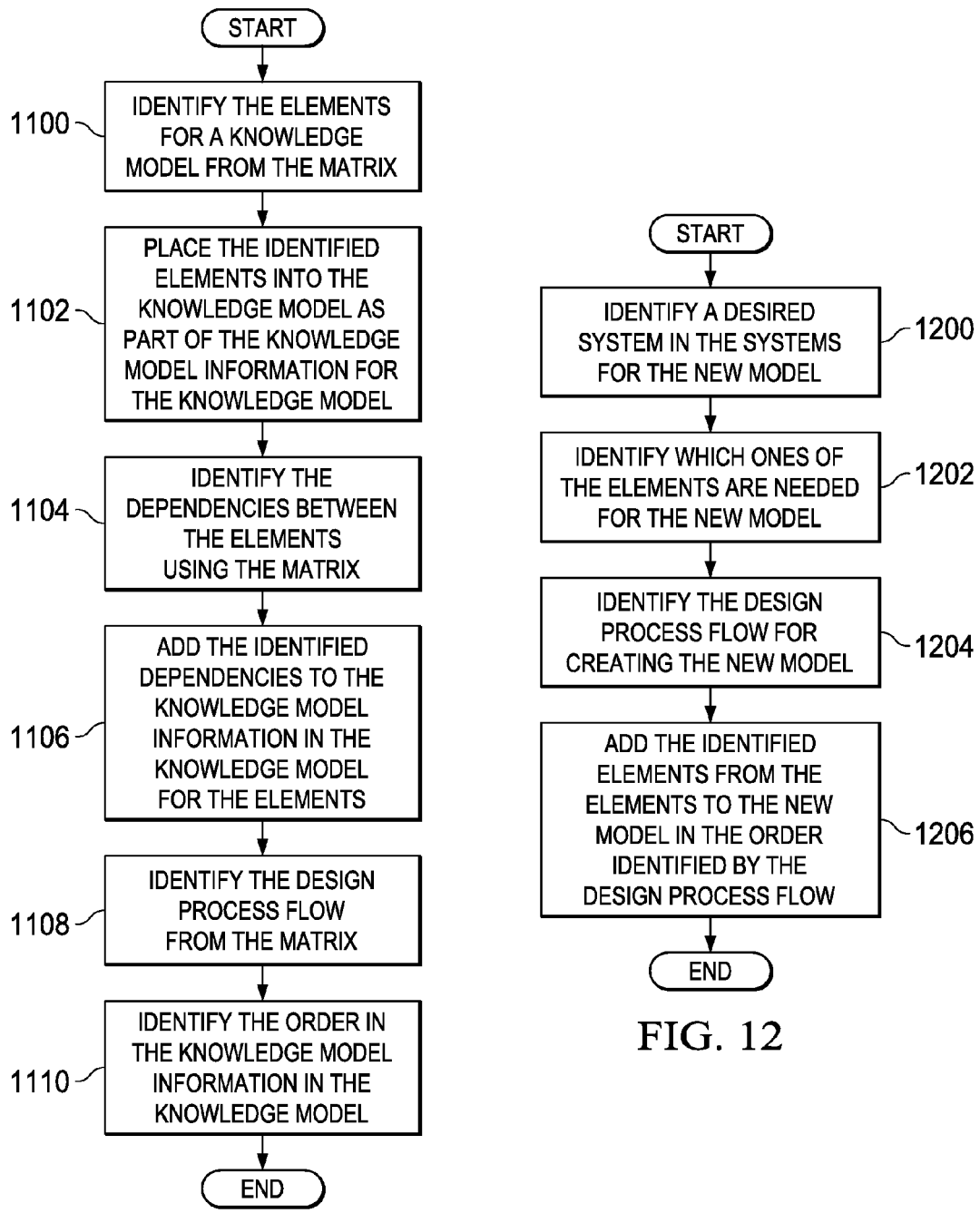
FIG. 11 is an illustration of a flowchart of a process for generating a knowledge model in accordance with an advantageous embodiment.
FIG. 12 is an illustration of a flowchart of a process for creating a new model in accordance with an advantageous embodiment.

With reference now to FIG. 11, an illustration of a flowchart of a process for generating a knowledge model, such as the knowledge model 500 in FIG. 5, is depicted in accordance with an advantageous embodiment. The process may be implemented using the model manager 106 in FIG. 1.

The process begins by identifying the elements 504 for the knowledge model 500 from the matrix 302 in FIG. 3 (operation 1100). The process then places the identified elements 504 into the knowledge model 500 as part of the knowledge model information 502 for the knowledge model 500 in FIG. 5 (operation 1102). In the illustrative examples, the elements 504 may be processed to remove extraneous elements and consolidate redundant elements prior to the elements 504 being placed into the knowledge model 500.

The process also identifies the dependencies 506 between the elements 504 using the matrix 302 in FIG. 3 (operation 1104).

Thereafter, these identified dependencies 506 are added to the knowledge model information 502 in the knowledge model 500 for the elements 504 (operation 1106). The process also identifies the design process flow 508 from the matrix 302 (operation 1108).

Additionally, other object information may be identified for the knowledge model information 502 in the knowledge model 500.

In some illustrative examples, the design process flow 508 may be identified in other ways other than using the matrix 302. For example, a graph of the elements 202 in the model 200 in FIG. 2 may be made. The nodes in the graph represent the elements 202. The lines between the nodes represent the dependencies 222. This information may be obtained from the analysis of the model 200, including the tree 224 in the model 200.

The tree 224 may be traversed to identify the dependencies 222 for the elements 202 in the model 200. With the graph, the design process flow 508 may be identified for the knowledge model 500. In other words, the techniques used to identify the design process flow 508 from the matrix 302 also may be used to identify the design process flow 508 from the graph.

In these illustrative examples, the order 512 may be identified in the knowledge model information 502 in the knowledge model 500 (operation 1110). The process terminates thereafter. This process may be performed for each knowledge model that is to be created for a particular model.

With reference now to FIG. 12, an illustration of a flowchart of a process for creating a new model is depicted in accordance with an advantageous embodiment. The process illustrated in FIG. 12 may be implemented using the model manager 106 in FIG. 1. In these illustrative examples, the knowledge model 500 in FIG. 5 may be used to create the new model 144 in FIG. 1. The creation of the new model 144 by the model manager 106 may be performed directly by the model manager 106 or with the use of a computer aided design system in the systems 158 in FIG. 1.

The process begins by identifying a desired system in the systems 158 for the new model 144 (operation 1200). This desired system may be, for example, a particular type of computer aided design system or the analysis system 160 in FIG. 1. For example, the analysis system 160 may be a finite element analysis system or some other suitable type of system that may not use computer aided design models for the analysis 132. In this manner, the new model 144 may be tailored for the particular type of system used in the systems 158 in FIG. 1.

The process then identifies which ones of the elements 504 are needed for the new model 144 (operation 1202). In some cases, only some of the elements 504 may be needed for the new model 144. As another example, the second format 150 for the new model 144 may not use all of the elements 504. In another example, a particular assembly 170 in the assemblies 164 for the object 120 may be selected for the new model 144. As a result, only those portions of the elements 504 in the particular assembly 170 may be needed for the new model 144. Further in operation 1202, a number of extraneous elements in the elements 504 may be removed from the knowledge model 500 prior to forming the new model 144 from the knowledge model 500. Also, redundant elements in the elements 504 may be consolidated in the knowledge model 500 prior to forming the new model 144 from the knowledge model 500.

The process also identifies the design process flow 508 for creating the new model 144 (operation 1204). In these illustrative examples, the new model 144 is created based on the order 512 identified by the design process flow 508 for the elements 504. The process adds the identified elements from the elements 504 to the new model 144 in the order 512 identified by the design process flow 508 (operation 1206) with the process terminating thereafter. In operation 1206, these elements 504 are placed into the new model 144 with a format for the desired system to form the new model 144.

In these illustrative examples, all of the knowledge model information 502 is maintained in the knowledge model 500 in case another new model is to be generated that may need different portions of the knowledge model information 502 to generate the new model.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the knowledge model 500 generated in the operations in FIG. 11 may be generated without using the matrix 302 in FIG. 3. Instead, the model manager 106 may use the model 108 directly or by interacting with the first type of computer aided design system 140 in FIG. 1 that uses the model 108 with the first format 148. For example, the identification of the elements 504 and the dependencies 506 between the elements may be performed in this manner to generate the information for the knowledge model 500.

Figure 13:
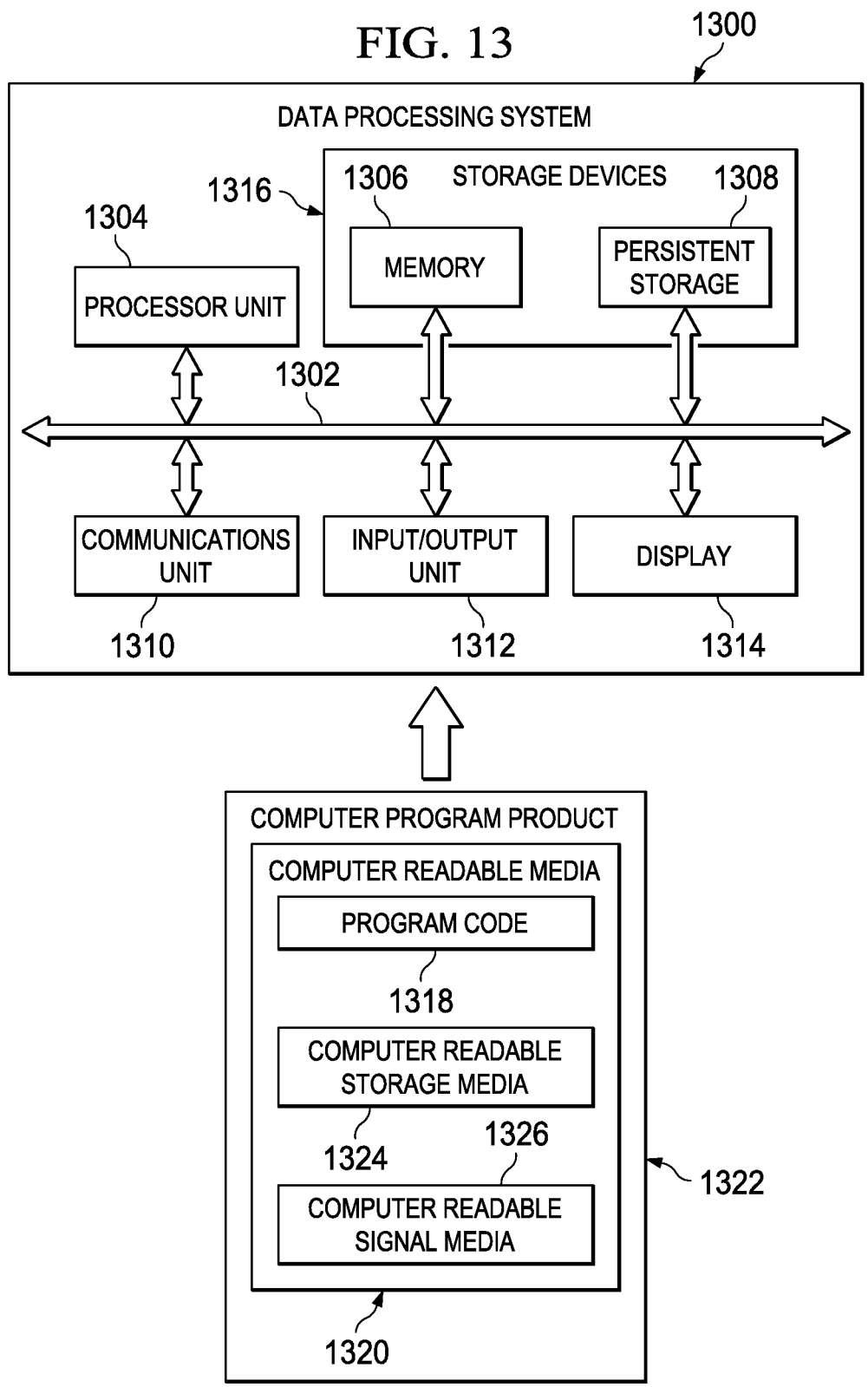
FIG. 13 is an illustration of a data processing system in accordance with an advantageous embodiment.

Turning now to FIG. 13, an illustration of a data processing system is depicted in accordance with an advantageous embodiment. The data processing system 1300 may be used to implement the computer system 122 in FIG. 1. In this illustrative example, the data processing system 1300 includes a communications framework 1302, which provides communications between a processor unit 1304, a memory 1306, a persistent storage 1308, a communications unit 1310, an input/output (I/O) a unit 1312, and a display 1314. In this example, communication framework may take the form of a bus system.

The processor unit 1304 serves to execute instructions for software that may be loaded into the memory 1306. The processor unit 1304 may be a number of processors, a multi-processor core, or some other type of processor, depending on the particular implementation.

The memory 1306 and the persistent storage 1308 are examples of storage devices 1316. A storage device is any piece of hardware that is capable of storing information, such as, for example, without limitation, data, program code in functional form, and/or other suitable information either on a temporary basis and/or a permanent basis. The storage devices 1316 may also be referred to as computer readable storage devices in these illustrative examples. The memory 1306, in these examples, may be, for example, a random access memory or any other suitable volatile or non-volatile storage device. The persistent storage 1308 may take various forms, depending on the particular implementation.

For example, the persistent storage 1308 may contain one or more components or devices. For example, the persistent storage 1308 may be a hard drive, a flash memory, a rewritable optical disk, a rewritable magnetic tape, or some combination of the above. The media used by the persistent storage 1308 also may be removable. For example, a removable hard drive may be used for the persistent storage 1308.

The communications unit 1310, in these illustrative examples, provides for communications with other data processing systems or devices. In these illustrative examples, the communications unit 1310 is a network interface card.

The input/output unit 1312 allows for input and output of data with other devices that may be connected to the data processing system 1300. For example, the input/output unit 1312 may provide a connection for user input through a keyboard, a mouse, and/or some other suitable input device. Further, the input/output unit 1312 may send output to a printer. The display 1314 provides a mechanism to display information to a user.

Instructions for the operating system, applications, and/or programs may be located in the storage devices 1316, which are in communication with the processor unit 1304 through the communications framework 1302. The processes of the different embodiments may be performed by the processor unit 1304 using computer-implemented instructions, which may be located in a memory, such as the memory 1306.

These instructions are referred to as program code, computer usable program code, or computer readable program code that may be read and executed by a processor in the processor unit 1304. The program code in the different embodiments may be embodied on different physical or computer readable storage media, such as the memory 1306 or the persistent storage 1308.

A program code 1318 is located in a functional form on a computer readable media 1320 that is selectively removable and may be loaded onto or transferred to the data processing system 1300 for execution by the processor unit 1304. The program code 1318 and the computer readable media 1320 form a computer program product 1322 in these illustrative examples. In one example, the computer readable media 1320 may be a computer readable storage media 1324 or a computer readable signal media 1326.

In these illustrative examples, the computer readable storage media 1324 is a physical or tangible storage device used to store the program code 1318 rather than a medium that propagates or transmits the program code 1318.

Alternatively, the program code 1318 may be transferred to the data processing system 1300 using the computer readable signal media 1326. The computer readable signal media 1326 may be, for example, a propagated data signal containing the program code 1318. For example, the computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for the data processing system 1300 are not meant to provide architectural limitations to the manner in which different embodiments may be implemented. The different advantageous embodiments may be implemented in a data processing system including components in addition to and/or in place of those illustrated for the data processing system 1300. Other components shown in FIG. 13 can be varied from the illustrative examples shown. The different embodiments may be implemented using any hardware device or system capable of running the program code 1318.

Advantageous embodiments of the disclosure may be described in the context of an aircraft manufacturing and service method 1400 as shown in FIG. 14 and an aircraft 1500 as shown in FIG. 15. Turning first to FIG. 14, an illustration of an aircraft manufacturing and service method is depicted in accordance with an advantageous embodiment. During pre-production, the aircraft manufacturing and service method 1400 may include specification and a design 1402 of the aircraft 1500 in FIG. 15 and a material procurement 1404.

During production, component and subassembly manufacturing 1406 and system integration 1408 of the aircraft 1500 in FIG. 15 takes place. Thereafter, the aircraft 1500 in FIG. 15 may go through certification and delivery 1410 in order to be placed in service 1412. While in service 1412 by a customer, the aircraft 1500 in FIG. 15 is scheduled for routine maintenance and service 1414, which may include modification, reconfiguration, refurbishment, and other maintenance or service.

Each of the processes of the aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an advantageous embodiment may be implemented. In this example, the aircraft 1500 is produced by the aircraft manufacturing and service method 1400 in FIG. 14 and may include an airframe 1502 with a plurality of systems 1504 and an interior 1506. Examples of the systems 1504 include one or more of a propulsion system 1508, an electrical system 1510, a hydraulic system 1512, and an environmental system 1514. Any number of other systems may be included. Although an aerospace example is shown, different advantageous embodiments may be applied to other industries, such as the automotive industry.

Apparatuses and methods embodied herein may be employed during at least one of the stages of the aircraft manufacturing and service method 1400 in FIG. 14. For example, models for the aircraft 1500 may be created, modified, analyzed, or otherwise managed using the model management system 100 in FIG. 1 during different stages of the aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while the aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while the aircraft 1500 is in service 1412 and/or during maintenance and service 1414 in FIG. 14. The use of a number of the different advantageous embodiments may substantially expedite the assembly of and/or reduce the cost of the aircraft 1500.

Thus, the different advantageous embodiments provide a method and apparatus for managing models. With one or more advantageous embodiments, a data structure 114 in the form of a matrix 116 may be generated to aide in the analysis 132 of the models 104 such as a model 108. Further, with the different advantageous embodiments, the models 104 may be managed to generate a new model 144 for use with a particular system in the systems 158 when an existing model in the models 104 is not present.

With one or more of the different advantageous embodiments, existing models in the models 104 in FIG. 1 may be analyzed and modified to eliminate extraneous elements and redundancies in those models. Further, these and other modifications may be made to increase the speed and efficiency at which the models 104 may be processed using the systems 158 in FIG. 1.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for managing a computer aided design model of an object, the method comprising:

a processor identifying elements in the computer aided design model;

identifying, by the processor, dependencies in the computer aided design model between the elements;

generating, by the processor, a matrix of the dependencies, wherein rows and columns of the matrix are the elements, and wherein values in the matrix represent a strength of the dependencies between the elements;

using the values in the matrix to identify a number of extraneous elements in the computer aided design model, wherein extraneous elements are defined as having no dependencies leading back to the object;

removing the number of extraneous elements in the computer aided design model based on their lack of dependencies to form a modified computer aided design model;

using the computer aided design model to identify a number of redundant portions of the elements in the computer aided design model, wherein each redundant portion is a first portion of a first element in the computer aided design model that is identical to a second portion of a second element in the computer aided design model; and consolidating the number of redundant portions identified by modifying at least one of the redundant portions to form the modified computer aided design model;

identifying in the elements a set of clusters, wherein clusters in the set of clusters correspond to assemblies of the elements;

generating, by the processor, a knowledge model for the object based in part on the values in the matrix, wherein the knowledge model is stored in a knowledge database in a universal format that includes the elements and clusters corresponding to assemblies of the elements, which functions as a source to create, for a particular assembly, computer aided design models for a number of formats;

identifying a design process flow for the knowledge model from the matrix, the design process flow identifying an order in which the elements of the computer aided design model were added to the computer aided design model;

creating, by the processor, a new computer aided design model of the object using the modified computer aided design model, the matrix and the design process flow; and creating a physical component based on the new computer aided design model of the object;

wherein the elements are geometric elements chosen from a group consisting of a solid, a surface, a plane, a point, a curve, a vertex, an edge, and a face; and wherein the elements of the new computer aided design model are ordered in the rows and columns of the matrix in the order identified by the design process flow such that an element in the elements that was most recently added to the computer aided design model is in a row at a top of the matrix.

2. The method of claim 1, further comprising:

performing an analysis using the matrix, wherein the analysis identifies at least one of the dependencies between the elements, a design process for the computer aided design model, the number of extraneous elements, and redundant elements.

3. The method of claim 1, wherein the computer aided design model is in a first format configured for use with a first type of computer aided design system and further comprising:
identifying a second type of computer aided design system;
wherein the new computer aided design model is in a second format configured for use with the second type of computer aided design system;
identifying a design process flow for the knowledge model from the matrix, the design process flow identifying an order in which the elements of the computer aided design model were added to the computer aided design model;
identifying ones of the elements that are needed for the new computer aided design model; and
adding the ones of the elements identified to the new computer aided design model in the order identified by the design process flow.

4. The method of claim 1, wherein the matrix is a design structure matrix.

5. The method of claim 1, further comprising:
identifying a desired system, wherein the new computer aided design model is created from the knowledge model and is configured for use with the desired system.

6. The method of claim 1, further comprising:
using, by the processor, the values in the matrix to identify a clustering of the elements;
creating, by the processor, the design process flow for the object based in part on the clustering of the elements; and
wherein the step of generating, by the processor, the knowledge model for the object includes using the design process flow.

7. The method of claim 5, wherein the desired system is selected from one of a computer aided design system, an analysis system, and a finite element analysis system.

8. The method of claim 1, wherein the dependencies represent a parent-child relationship or an input-out relationship between the elements.

9. A model management system comprising:
a processor configured to implement a model manager, the model manager configured to:
identify elements in a computer aided design model of an object;
identify dependencies in the computer aided design model between the elements;
generate a matrix of the dependencies, wherein rows and columns of the matrix are the elements and values in the matrix represent a strength of the dependencies between the elements;
use the values in the matrix to identify a number of extraneous elements in the computer aided design model, wherein extraneous elements are defined as having no dependencies leading back to the object;
remove the number of extraneous elements in the computer aided design model based on their lack of dependencies to form a modified computer aided design model;
identify a number of redundant portions of the elements in the computer aided design model, wherein each redundant portion is a first portion of a first element in the computer aided design model that is identical to a second portion of a second element in the computer aided design model; and
consolidate the number of redundant portions by modifying at least one of the redundant portions identified to form the modified computer aided design model;
identify in the elements a set of clusters, wherein clusters in the set of clusters correspond to assemblies of the elements;
generate a knowledge model for the object based in part on the values in the matrix, wherein the knowledge model is stored in a knowledge database in a universal format that includes the elements and clusters corresponding to assemblies of the elements, which functions as a source to create, for a particular assembly, computer aided design models for a number of formats;
identify a design process flow for the knowledge model from the matrix, the design process flow identifying an order in which the elements of the computer aided design model were added to the computer aided design model;
create a new computer aided design model of the object using the modified computer aided design model, the matrix and the design process flow; and
create a physical component based on the new computer aided design model of the object;
wherein the elements are geometric elements chosen from a group comprising a solid, a surface, a plane, a point, a curve, a vertex, an edge, and a face; and
wherein the elements of the new computer aided design model are ordered in the rows and columns of the matrix in the order identified by the design process flow such that an element in the elements that was most recently added to the computer aided design model is in a row at a top of the matrix.

10. The model management system of claim 9, wherein the model manager is further configured to perform an analysis using the matrix, wherein the analysis identifies at least one of the dependencies between the elements, a design process for the computer aided design model, the number of extraneous elements, and redundant elements.

11. The model management system of claim 9, wherein the computer aided design model is in a first format configured for use with a first type of computer aided design system and wherein the model manager is further configured to:
identify a second type of computer aided design system;
wherein the new computer aided design model is in a second format configured for use with the second type of computer aided design system;
identify ones of the elements that are needed for the new computer aided design model; and
add the ones of the elements identified to the new computer aided design model in the order identified by the design process flow.

12. The model management system of claim 9, wherein the model manager is further configured to identify a desired system and create the new computer aided design model of the object from the knowledge model, wherein the new computer aided design model is configured for use with the desired system.

13. The model management system of claim 12, wherein the model manager is further configured to:
use the values in the matrix to identify a clustering of the elements;
create the design process flow for the object based in part on the clustering of the elements; and wherein in being configured to generate the knowledge model of the object, the model manager is further configured to create the knowledge model using the design process flow.

14. The model management system of claim 12, wherein the desired system is selected from one of a computer aided design system, an analysis system, and a finite element analysis system.

15. A method for managing a computer aided design model of an object, comprising:

identifying, by a processor, elements in the computer aided design model, wherein the elements comprise geometric components of the computer aided design model of the object;

identifying, by the processor, dependencies in the computer aided design model between the elements;

identifying, by the processor, a design process flow that identifies an order in which the elements were added to the computer aided design model;

generating, by the processor, a matrix of the dependencies, wherein rows and columns of the matrix are the elements in the order in which the elements were added to the computer aided design model based on the design process flow, wherein values in the matrix represent a strength of the dependencies between the elements, and wherein the dependencies represent a parent-child relationship or an input-out relationship between the elements;

using, by the processor, the values in the matrix to identify a cluster of the elements;

creating, by the processor, the design process flow for the object based in part on the cluster of the elements;

using the values in the matrix to identity a number of extraneous elements in the computer aided design model, wherein extraneous elements are defined as having no dependencies leading back to the object;

removing the number of extraneous elements in the computer aided design model based on their lack of dependencies to form a modified computer aided design model;

using the computer aided design model to identify a number of redundant portions of the elements in the computer aided design model, wherein each redundant portion is a first portion of a first element in the computer aided design model that is identical to a second portion of a second element in the computer aided design model; and consolidating the number of redundant portions identified by modifying at least one of the redundant portions to form the modified computer aided design model;

creating, by the processor, a new computer aided design model of the object using the modified computer aided design model, the matrix and the design process flow; and creating a physical component based on the new computer aided design model of the object, wherein the elements of the new computer aided design model are ordered in the rows and columns of the matrix in the order identified by the design process flow such that an element in the elements that was most recently added to the computer aided design model is in a row at a top of the matrix.

* * * * *

UNITED STATES PATENT AND TRADEMARK OFFICE
CERTIFICATE OF CORRECTION

PATENT NO. : 9,619,586 B2  
APPLICATION NO. : 13/290715  
DATED : April 11, 2017  
INVENTOR(S) : Bhaskara Page 1 of 1

It is certified that error appears in the above-identified patent and that said Letters Patent is hereby corrected as shown below:

In the Claims

Column 24, Line 1, Claim 15 change "identity" to -- identify --

Signed and Sealed this
Sixth Day of February, 2018

Joseph Matal
*Performing the Functions and Duties of the*
*Under Secretary of Commerce for Intellectual Property and*
*Director of the United States Patent and Trademark Office*